United States Patent
van Wijngaarden et al.

(10) Patent No.: US 6,726,002 B2
(45) Date of Patent: Apr. 27, 2004

(54) APPARATUS FOR DELIVERING SUBSTANTIALLY SPHERICAL PRODUCTS INTO A SUBSTANTIALLY RECTANGULAR CONTAINER

(75) Inventors: Erik van Wijngaarden, Hengelo (NL); Hendrikus Jacobus Weterings, Hoek van Holland (NL)

(73) Assignee: FPS Food Processing System B.V. (NL)

( * ) Notice: Subject to any disclaimer, the term of this patent is extended or adjusted under 35 U.S.C. 154(b) by 0 days.

(21) Appl. No.: 10/180,966

(22) Filed: Jun. 27, 2002

(65) Prior Publication Data

US 2003/0000968 A1 Jan. 2, 2003

(30) Foreign Application Priority Data

Jun. 29, 2001 (NL) .............................................. 1018425

(51) Int. Cl.$^7$ .............................................. B65G 25/00
(52) U.S. Cl. ........................ 198/614; 198/533; 53/244; 53/248
(58) Field of Search ................ 198/614, 533; 53/244, 248

(56) References Cited

U.S. PATENT DOCUMENTS

| | | | | |
|---|---|---|---|---|
| 2,889,676 A | * | 6/1959 | Griffin ........................ | 53/244 |
| 3,040,864 A | * | 6/1962 | Belk ........................ | 198/479.1 |
| 3,147,846 A | * | 9/1964 | Huntoon ........................ | 53/248 |
| 4,194,343 A | | 3/1980 | Myers et al. | |
| 4,309,944 A | * | 1/1982 | Frost et al. ........................ | 100/104 |
| 4,501,350 A | | 2/1985 | Muller et al. | |
| 5,048,666 A | * | 9/1991 | Huggins et al. ........................ | 198/431 |
| 5,072,100 A | | 12/1991 | McClusky et al. | |
| 5,598,771 A | * | 2/1997 | Main et al. ........................ | 99/489 |
| 5,772,004 A | * | 6/1998 | Main ........................ | 198/536 |

FOREIGN PATENT DOCUMENTS

| | | |
|---|---|---|
| FR | 1.493.746 | 9/1967 |
| NL | 1001697 | 11/1996 |
| WO | 00/12415 | 3/2000 |

* cited by examiner

*Primary Examiner*—Richard Ridley
(74) *Attorney, Agent, or Firm*—Stites & Harbison PLLC; Marvin Petry

(57) ABSTRACT

An apparatus for delivering substantially spherical products into a substantially rectangular container having an open top. The apparatus is provided with a delivery element arranged to be movable up and down relative to the container. The container is movable in a horizontal direction relative to the delivery element. The delivery element includes at least one endless conveyor which is provided with supporting elements which define a number of supporting surfaces extending in horizontal direction. An intermediate conveyor is arranged upstream of the delivery element. The intermediate conveyor is aligned with the delivery element and is arranged for row-by-row transfer of the products to the delivery element. A vibrating feeder is arranged upstream of the intermediate conveyor. The vibrating feeder has a discharge side aligned with an infeed side of the intermediate conveyor. The vibrating feeder also has an infeed side alignable with a discharge conveyor of another apparatus, such as, for instance, a fruit sorter.

30 Claims, 5 Drawing Sheets

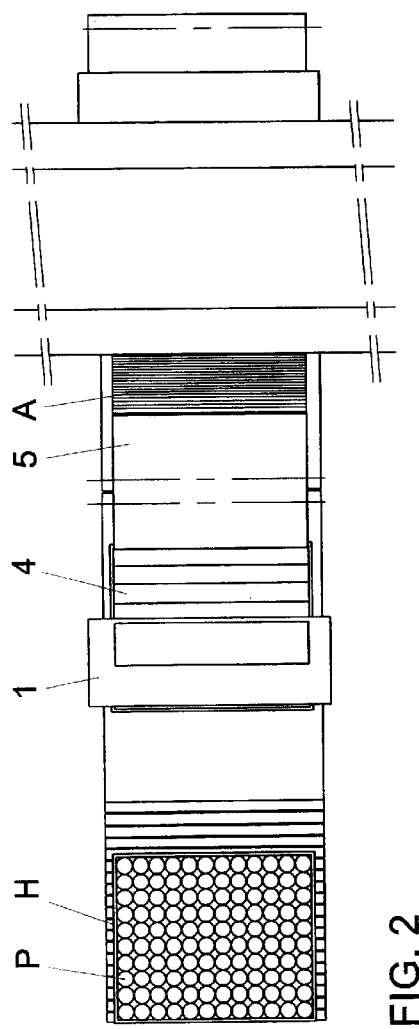
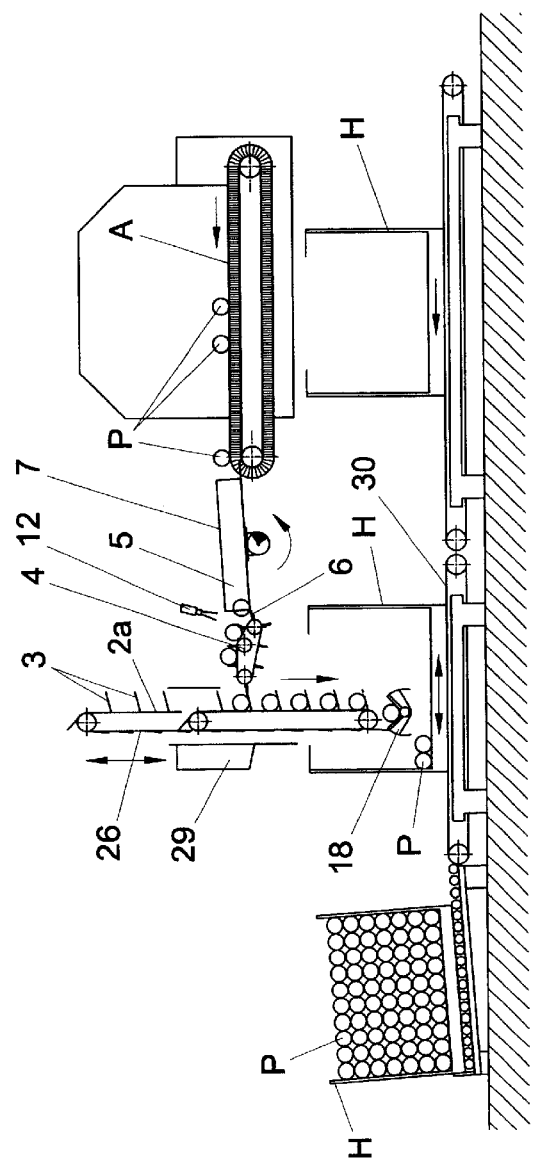
FIG. 2
FIG. 1

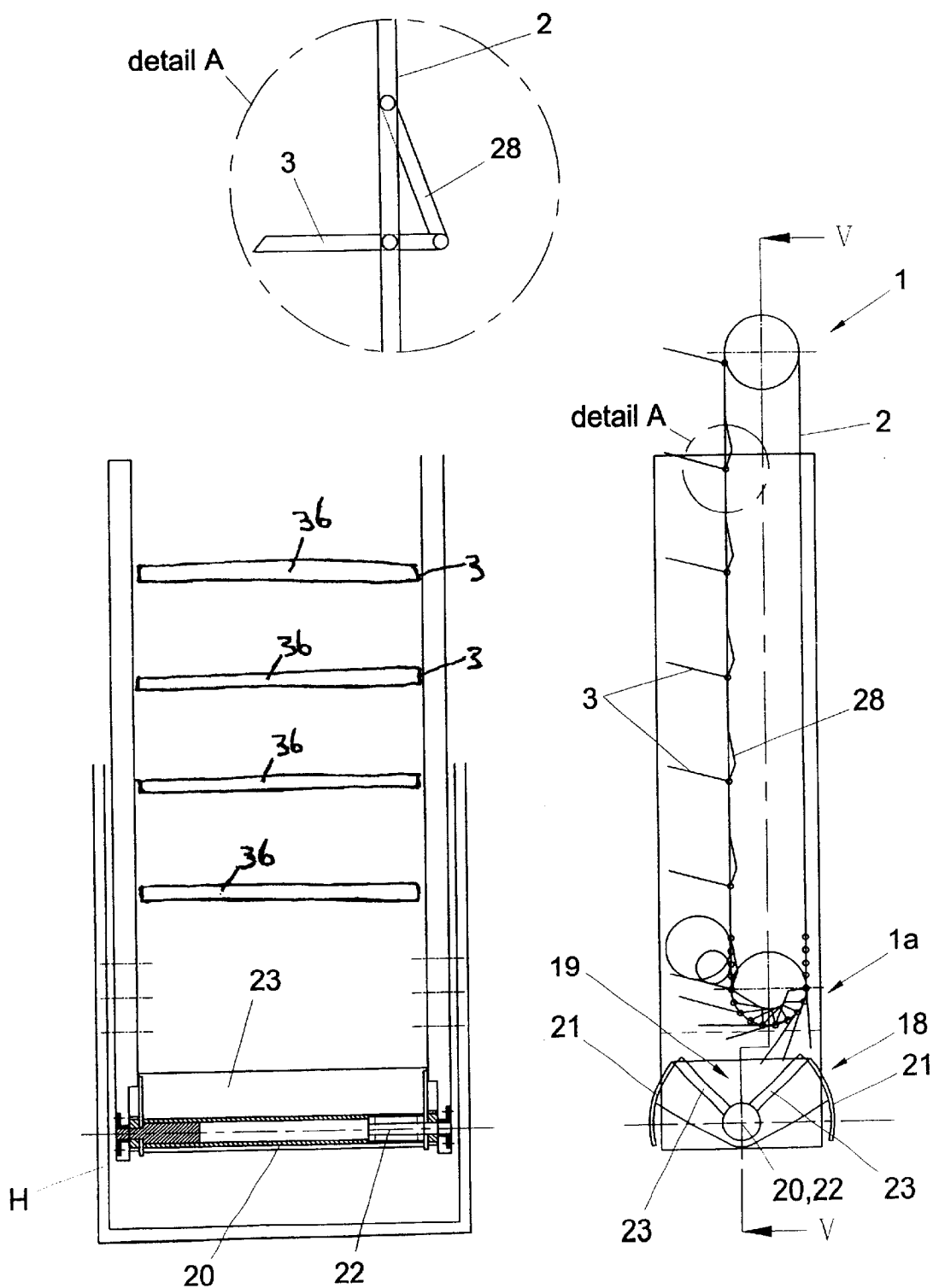

US 6,726,002 B2

APPARATUS FOR DELIVERING SUBSTANTIALLY SPHERICAL PRODUCTS INTO A SUBSTANTIALLY RECTANGULAR CONTAINER

This invention relates to an apparatus for delivering substantially spherical products into a substantially rectangular container having an open top.

BACKGROUND OF THE INVENTION

A prior apparatus is known from Dutch patent NL 1001697. Although the known apparatus in itself is reasonably satisfactory, there is a need for a machine having a higher capacity, where the risk of damage to the products is reduced still further. The roller conveyor used in the known apparatus has the disadvantage that it conveys incompletely filled rows of products to the delivery element. As a result, the container is not filled with complete rows, so that the products P are yet to be displaced within the container. Such displacement may entail damages. When such displacement is not done in the container, the container H will not be optimally filled with products P.

SUMMARY OF THE INVENTION

To solve problems in the art, the apparatus according to the invention is provided by an apparatus for delivering substantially spherical products into a substantially rectangular container having an open top. The apparatus includes a deliver element arranged to be movable up and down relative to the container. The container is movable in horizontal a direction relative to the delivery element. The delivery element has at least one endless conveyor which is provided with supporting elements which define a number of supporting surfaces extending substantially in horizontal direction. An intermediate conveyor is ranged upstream of the delivery element which the delivery element is aligned with the delivery element and arranged for row-to-row transfer of the products to the delivery element. A vibrating feeder is arranged upstream of the intermediate conveyor and has a discharge side aligned with an infeed side of the intermediate conveyor. The vibrating feed has an infeed side alignable with a discharge conveyor of another apparatus. The apparatus also has a comb-shaped threshold plate which serves as threshold and inclined slightly upwards, when viewed in the conveying direction.

The invention also provides a method for delivering substantially spherical Products into a substantially rectangular container having an open top. The method includes ordering the products coming from a discharge conveyor of another apparatus in a particular desired pattern with the aid of a vibrating operation using a slightly inclined comb-shaped threshold plate which serves as a threshold. Further, the method includes picking up and placing in the substantially rectangular container the products while in such pattern.

The vibrating feeder provides for the formation of completely filled rows of products which are taken over in rows by the intermediate conveyor, which proceeds to transfer each time a completely filled row to the delivery element. As a result of the presence of the vibrating feeder, the container is filled with complete rows of products, so that the products do not need to move within the container anymore to fill up "holes" in the product pattern already present in the container. Moreover, the apparatus according to the invention provides the possibility of processing products having mutually considerably different dimensions. In particular when the products are natural products, such as, for instance, apples, paprikas or like fruits or vegetable products, this property is of particularly great importance.

To still further improve the delivery of the products by the delivery element into the container, according to a further elaboration of the invention, adjacent a delivery end of the delivery element, a positioning device is connected with the delivery element, which positioning device is provided with a V-shaped receiving cavity for receiving a row of products which has been delivered by the delivery element, the V-shaped receiving cavity being rotatable about an axis extending in horizontal direction. It is then preferred that an open side of the V-shaped receiving cavity is closable with the aid of a guard, which guard is rotatable about a second axis concentric with the first axis. It is then recommended to operatively tune the rotation of the V-shaped cavity and the guard to each other, such that when filling the V-shaped cavity with products and emptying it, the impacts sustained by the products are minimal. With the aid of the positioning device, a highly controlled delivery of products to the container is accomplished.

BRIEF DESCRIPTION OF THE DRAWING

The invention will presently be elucidated on the basis of an exemplary embodiment with reference to the drawing, wherein:

FIG. 1 shows a side view of the exemplary embodiment;

FIG. 2 shows a top plan view of the apparatus represented in FIG. 1;

FIG. 4 shows a side elevation of the delivery element and the positioning device in more detail;

FIG. 5 shows a front view of the delivery element and the positioning device represented in FIG. 4;

DETAILED DESCRIPTION OF THE INVENTION

Figure 3:
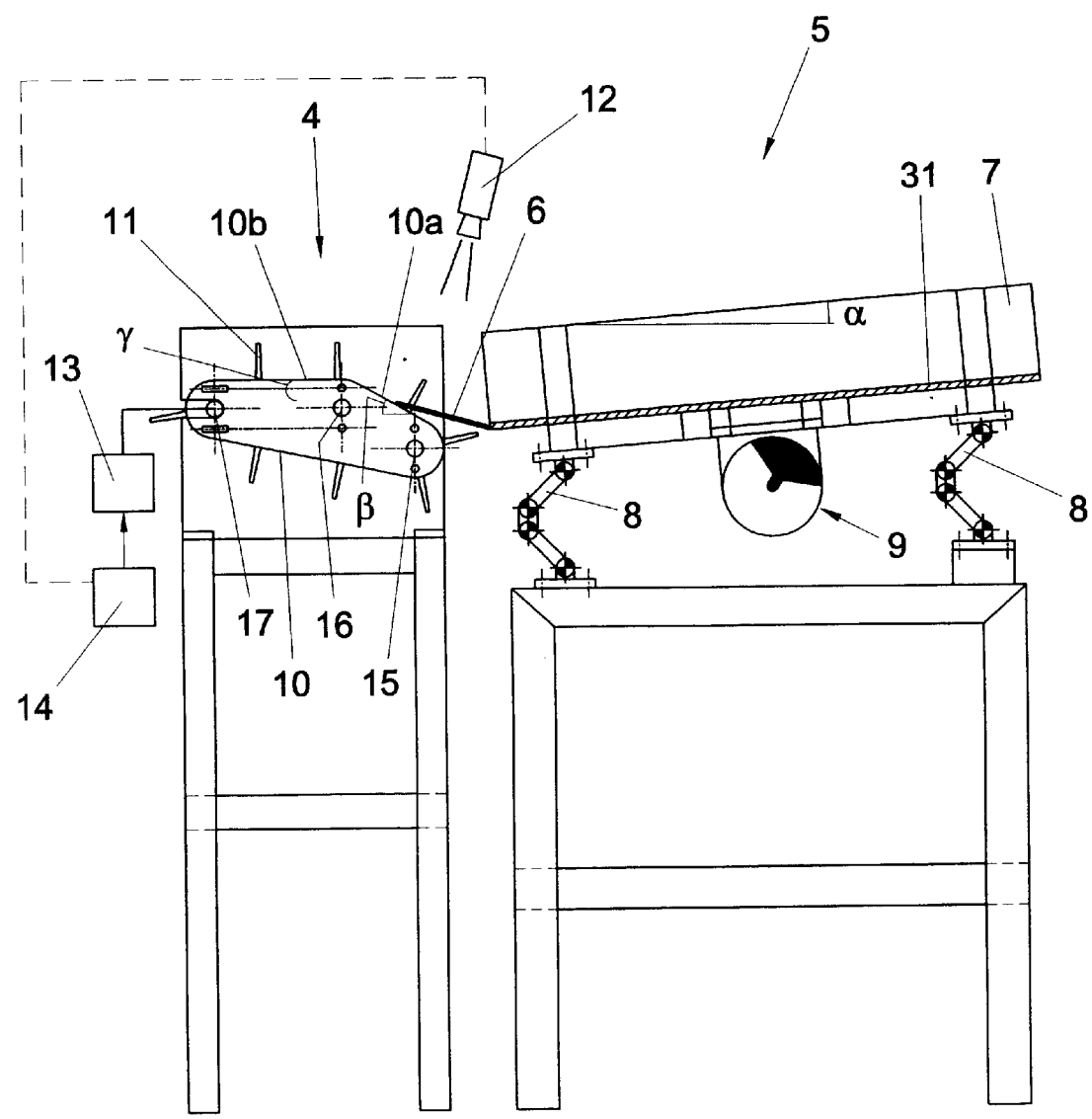
FIG. 3 shows a side elevation of the vibrating feeder and the intermediate conveyor in more detail.

In the present exemplary embodiment, the apparatus has an infeed end aligned with the discharge conveyor A of a fruit sorter, for instance of the type "Calistar" marketed by Aweta BV of Nootdorp, the Netherlands. The apparatus is intended to place products P, supplied by the discharge conveyor A, in a container H in a highly controlled manner. In the present exemplary embodiment, the containers are so-called dry bins having a substantially rectangular bottom and an open top. Connected to the discharge end of the discharge conveyor A is a vibrating feeder 5. The vibrating feeder 5, at an outlet thereof, is provided with a threshold plate 6 extending slightly upwards, viewed in the conveying direction, on which threshold plate 6 a row of products is formed. The threshold plate 6 constitutes the connection between the feeder. The intermediate conveyor 4 conveys the products to the delivery element 1. The delivery element 1 is provided with supporting elements 3 which jointly define a number of supporting surfaces extending substantially in horizontal direction. In the present exemplary embodiment, the supporting elements 3 are connected with two endless conveyors 2, such as, for instance, chains. The supporting elements 3 from a single horizontal row are mutually connected via a flexible flap 36 (FIG. 5) which forms a supporting surface on which the products P can rest. The supporting elements 3 are pivotally connected with the respective conveyors 2, such that, in a descending part 2a of the conveyors 2, they assume an extended position in which the products can rest on the supporting elements 3, and in an ascending part 2b of the conveyors the supporting elements assume a collapsed position in which they abut against the ascending conveyor part 2b. This provides the advantage that the delivery element can approach any of the walls of the container H very closely, so that when filling the container H the products need to traverse hardly any rolling path, if at all. Such a solution is known per se from Dutch patent application number 1001697.

Referring to FIG. 3, presently, the vibrating feeder 5 and the intermediate conveyor 4 will be described in more detail. The vibrating feeder 5 is provided with a vibrating trough 7 which, viewed in the conveying direction, is inclined downwards at a small angle α, and which is provided with a support 8 and an energization 9 in the form of a motor with an eccentric arranged to impose a high vibrating frequency of a small amplitude on the trough 7. The vibrating trough 7 is covered with damping material 31 to prevent damage to the products during conveyance through the vibrating trough 7. The angle α is preferably in the range of from 1 to 10 degrees. The vibrating frequency is preferably in the range of from about 20 to about 100 Hz and the amplitude of the vibration is preferably in the range of from about 1 to about 4 mm.

The intermediate conveyor 4 comprises an endless conveyor 10 which is provided with fingers 11 arranged in rows and extending substantially perpendicularly to the conveying surface 10. The threshold plate 6 is preferably of comb-shaped design, so that the fingers 11 can be moved between the teeth of the comb-shaped threshold plate 6. The threshold plate 6 rests by a downstream end thereof on the endless conveyor 10 and the length of the fingers 11 arranged in rows is such that in use in each case one row of products P is carried along by the fingers 11 from the threshold plate 6. The intermediate conveyor 4 is provided with a drive 13, which is schematically represented, and a control 14. In the present exemplary embodiment, above the threshold plate 6, a series of sensors 12 is arranged for observing the presence of products P on the threshold plate 6. The sensors 12 in the present exemplary embodiment are designed as optical sensors. It will be self-evident, however, that other types of sensors can be used as well. Thus, for instance, weighing cells can be disposed under the threshold plate to observe the presence or absence of products P on the threshold plate 6. The control 14 is arranged for actuating the drive 13 each time when the sensors 12 deliver a signal to the control 14 signifying that a complete row of products P has formed on the threshold plate 6. In the present exemplary embodiment, the endless conveyor 10 is tensioned around three rotation axes 15, 16, 17. Viewed in the conveying direction, a first, upstream upper part 10a of the conveyor 10, extending between a first and a second rotation axis 15, 16, is upwardly inclined at a first angle β with the horizontal. A second upper part 10b, extending between the second and the third rotation axis 16, 17, extends at a second angle γ with the horizontal. The first angle β is preferably in the range of from about 5 to about 50 degrees. The second angle γ is less critical but is preferably in the range of from about −45 to about 45 degrees.

It is noted that the invention is not limited to the above-described vibrating feeder and intermediate conveyor. Thus, the intermediate conveyor can also comprise a series of grippers by which the row of products formed by the vibrating feeder is picked up row by row. Options also include other forms of intermediate conveyors.

Figure 6:
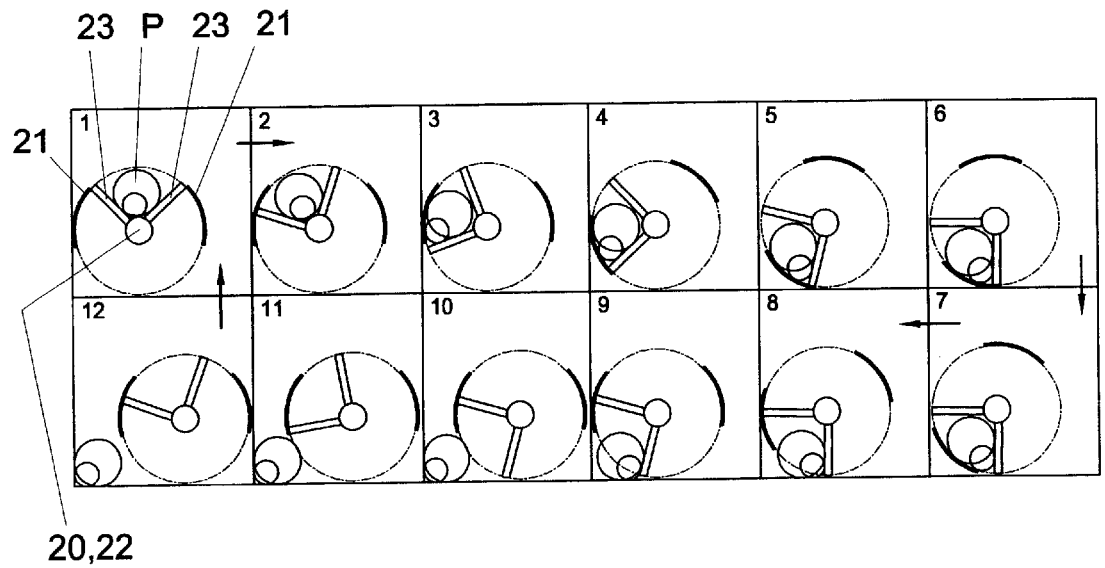
FIG. 6 shows twelve positions of the positioning device.

FIGS. 4 and 5 respectively show a side elevation and a sectional elevation taken on line V—V in FIG. 4, but it is to be noted that the drawings are of a diagrammatic nature and that various parts have not been represented in the drawing for the purpose of clarity. FIG. 4 clearly shows the delivery element 1 which is provided with two conveyors 2 between which extend the supporting elements 3. The supporting elements 3, as appears clearly from detail A of FIG. 4, are pivotally connected to the endless conveyor 2 and a flexible flap 36 (FIG. 5) is arranged thereon. Also, with each supporting element 3, a first end of a control rod 28 is pivotally connected. The control rod 28 has a second end thereof pivotally connected to the respective endless conveyor 2, such that the angle which the respective supporting element 3 includes with the horizontal in the descending part 2a of the conveyor 2 at the delivery end 1a of the delivery element 1 is maintained as long as possible (i.e., up to the end of the conveyor 2). The delivery element 1 is arranged so as to be movable up and down relative to the fixed world by means of a motor 29. Arranged under the delivery end 1a of the delivery element 1 is a positioning device 18, which is connected with delivery element 1. The positioning device 18 is provided with a V-shaped receiving cavity 19 for receiving a row of products P which has been delivered by the delivery element 1. The V-shaped receiving cavity 19 is rotatable about a first axis 20 extending in horizontal direction. The positioning device 18 is further provided with a guard 21 by means of which an open side of the V-shaped receiving cavity 19 is closable. The guard 21 is rotatable about a second axis 22, which is concentric with the first axis 20. In use, the rotation of the V-shaped cavities 19 and the guard 21 are turned to each other, such that when filling the V-shaped cavity 19 with products E and emptying it, the impacts sustained by the products are minimal. In the present exemplary embodiment, the V-shaped cavity 19 is bounded by two rows of brush hairs or plates 23, arranged in a V-shaped relative to each other and connected with a common first shaft 20. The guard 21 comprises two cylinder drum segments 21, which cylinder drum segments 21 are rotatable about the second axis 22. FIG. 6 shows twelve positions successively assumed by the V-shaped cavity 19 and the guard during pickup and delivery of a product. The successive figures clearly show that the products P are deposited in the container H in a highly controlled manner. Although FIG. 6 shows rotation of the V-shaped cavity 19 and the guard 21 in one direction, it will be clear that the V-shaped cavity 19 and the guard 21 can also be rotated in the other direction in order to position the products as closely as possible to the two opposite vertical walls of the container H.

Figure 7:
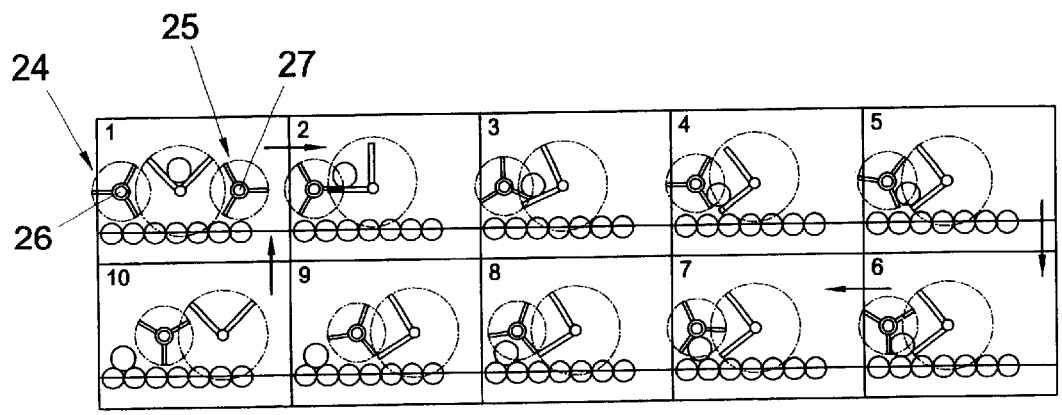
FIG. 7 shows ten positions of a positioning device according to an alternative embodiment.

FIG. 7 represents an alternative embodiment of a positioning device, in which, instead of the guard 21, on opposite sides of the V-shaped cavity 19, two brushes are disposed, extending parallel to the V-shaped cavity 19. Each brush 24, 25 is rotatable about an axis 26, 27 extending parallel to the first axis 21. Each brush 24, 25 itself, in turn, has receiving cavities extending in the longitudinal direction of the brush, which are bounded by the brush hairs of the respective brush 24, 25. In use, the rotation of the brushes 24, 25 and the rotation of the V-shaped cavity 19 are tuned to each other, such that during the filling of the V-shaped cavity 19 with products P and emptying it, the impacts sustained by the products P are minimal. For the purpose of apples, this effect is achieved by selecting the length of the legs of the V-shaped cavity in the range of 15–27 cm and by selecting the length of the circular arc included by the V-shaped cavity at the outer circumference thereof in the range of 17–22 cm. For other products, the length of the legs and the magnitude of the angle included by the legs can be varied to minimize the force of the impacts. The series of consecutive positions assumed by the V-shaped cavity and the neighboring brushes during the positioning of a product are represented in ten different positions of the delivery process in FIG. 7. In the series of figures, it is clearly visible that the products P sustain hardly any or no impact when being positioned in a container H. For the sake of clarity, in FIGS. 7.2–7.10 the right-hand brush 25 of the positioning device is not represented.

Figure 8:
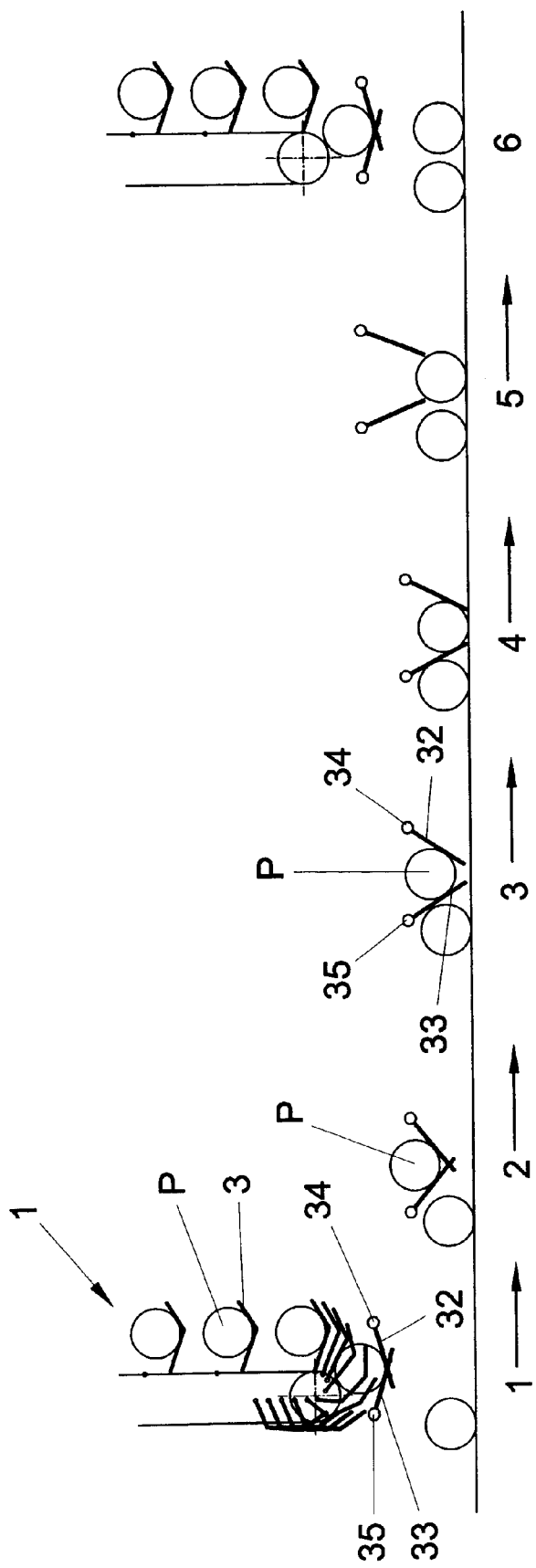
FIG. 8 shows six positions of a positioning device according to yet another alternative embodiment.

FIG. 8 shows a third embodiment of a positioning device according to a further elaboration of the invention, in six different positions assumed by this positioning device when placing a row of apples in the container H. In this exemplary embodiment, the positioning device comprises two rows of brushes 32, 33. Each row of brushes 32, 33 is connected with an associated rotation shaft 34, 35 being rotatable in opposite directions. Moreover, the rotation shafts 34, 35 are arranged so as to be movable in vertical direction relative to the delivery element 1. From supporting elements 3 of the delivery element 1 a row of products is placed on the brushes 32, 33 being in a closed position. Next, the rotation shafts 34, 35, and hence the brushes 32, 33, move down, and the rotation shafts 34, 35, and hence the brushes 32, 33, rotate such that the row of products P is delivered.

The operation of the apparatus is as follows:

The products P are supplied more or less in a random manner by the discharge conveyor A of the product source, designed as a fruit sorter in the present exemplary embodiment. In the vibrating feeder 5, the products, due to the vibratory movement of the vibrating feeder 5, are gradually conveyed to the comb-shaped threshold plate 6. As soon as a complete row of products P has formed on this threshold plate 6, the intermediate conveyor 4 takes over a complete row of products. From this intermediate conveyor 4, the products are transferred to the delivery element 1, which delivery element 1 conveys the products downwards and transfers them to the positioning device 18. By means of the positioning device 18, the products P are placed in the container H in a controlled manner. When the container H is completely filled, it is removed by means of a supporting conveyor 30. It is noted that during the filling of the container H the supporting conveyor 30 is used to displace the container H relative to the fixed world and hence relative to the delivery element 1.

It will be clear that the invention is not limited to the exemplary embodiment described, but that various modifications are possible within the framework of the invention as defined by the claims.

What is claimed is:

1. An apparatus for delivering substantially spherical products into a substantially rectangular container having an open top, said apparatus comprising:
   a delivery element arranged to be movable up and down relative to the container, the container being movable in a horizontal direction relative to the delivery element, the delivery element comprising at least one endless conveyor which is provided with supporting elements which define a number of supporting surfaces extending substantially in a horizontal direction;
   an intermediate conveyor arranged upstream of the delivery element, said intermediate conveyor aligned with the delivery element and arranged for row-by-row transfer of the products to the delivery element;
   a vibrating feeder arranged upstream of the intermediate conveyor and having a discharge side aligned with an infeed side of the intermediate conveyor and having an infeed side alignable with a discharge conveyor of another apparatus, and
   a comb-shaped threshold plate disposed between the vibrating feeder and the intermediate conveyor, the threshold plate serving as a threshold and inclined slightly upwards, when viewed in the conveying direction.

2. The apparatus according to claim 1, wherein the vibrating feeder comprises a vibrating trough which, viewed in the conveying direction, is inclined downwards at a small angle and which is provided with a support and energization device which is arranged to impose on the trough a high vibrating frequency of a small amplitude.

3. The apparatus according to claim 2, wherein the vibrating trough is covered with damping material to prevent damage to the products.

4. The apparatus according to claim 2, wherein the small angle is in the range from about 1 to about 10 degrees.

5. The apparatus according to claim 2, wherein the vibrating frequency is in the range from about 20 to about 100 Hz.

6. The apparatus according to claim 2, wherein the amplitude of the vibration is in the range from about 1 to about 4 mm.

7. The apparatus according to claim 1, wherein the intermediate conveyor comprises an endless conveyor which is provided with fingers arranged in rows.

8. The apparatus according to claim 1, wherein the fingers are movable between the teeth of the comb-shaped threshold plate and wherein the threshold plate has a discharge end resting on the endless conveyor, while the length of the fingers arranged in rows is such that in use in each case one row of products is carried along by the fingers from the threshold plate.

9. The apparatus according to claim 8, wherein the intermediate conveyor is provided with a drive and a control, the control being connected to sensors for observing the presence of products on the threshold plate, and the control further being arranged for actuating the drive each time when the sensors deliver a signal to the control signifying that a complete row of products has formed on the threshold plate.

10. The apparatus according to claim 7, wherein the endless conveyor is tensioned around at least three rotation axes, wherein, viewed in the conveying direction, a first upper part of the conveyor, extending between a first and a second rotation axis, is upwardly inclined at a first angle with the horizontal, while a second upper part of the conveyor, extending between the second and a third rotation axis, extends at a second angle with the horizontal.

11. The apparatus according to claim 9, wherein the first angle is in the range from about 5 to about 50 degrees.

12. The apparatus according to claim 1, wherein adjacent a delivery end of the delivery element a positioning device is connected with the delivery element.

13. The apparatus according to claim 12, wherein the positioning device is provided with a V-shaped receiving cavity for receiving a row of products which has been delivered by the delivery element, while the V-shaped receiving cavity is rotatable about a first axis extending in horizontal direction.

14. The apparatus according to claim 13, wherein the positioning device is further provided with a guard by means of which an open side of the V-shaped receiving cavity is closable, while the guard is rotatable about a second axis coaxial with the first axis.

15. The apparatus according to claim 14, wherein the rotation of the V-shaped cavity and the guard are operatively tuned to each other such that when filling the V-shaped cavity with products and emptying it, the impacts sustained by the products are minimal.

16. The apparatus according to claim 13, wherein for the purpose of processing apples, the length of the legs of the V-shaped cavity is in the range of 15–27 cm, while the length of the circular arc included by the V-shaped cavity at the outer circumference thereof is in the range of 17–22 cm.

17. The apparatus according to claim 14, wherein the V-shaped cavity is bounded by two rows of brush hairs or plates arranged in a V-shape relative to each other, and connected with a common first shaft, wherein the guard comprises two cylinder drum segments, which cylinder drum segments are rotatable about the second axis.

18. The apparatus according to claim 13, wherein on opposite sides of the positioning device two brushes are arranged, extending parallel to the V-shaped cavity, with each brush rotatable about an axis extending parallel to the one first axis, while each brush itself, in turn, has receiving cavities extending in the longitudinal direction of the brush, which are bounded by the brush hairs of the respective brush, while the rotation of the brushes and the rotation of the V-shaped cavity in use are tuned to each other such that when filling the V-shaped cavity with products and emptying it, the impacts sustained by the products are minimal.

19. The apparatus according to claim 12, wherein the positioning device comprises two rows of brushes, with each row of brushes connected with an associated rotation shaft, rotatable in opposite directions, which rotation shafts are arranged so as to be movable relative to the delivery element in vertical direction.

20. The apparatus according to claim 1, wherein the supporting elements are pivotally connected with the at least one conveyor, such that in a descending part of the at least one conveyor the supporting elements assume an extended position in which the products can rest on the supporting elements, and in an ascending part of the at least one conveyor, the supporting elements assume a collapsed position in which the supporting elements abut against the ascending conveyor part.

21. The apparatus according to claim 20, wherein on the supporting elements a flexible flap is arranged, and with each supporting element, further, a first end of a control rod is pivotally connected, which control rod has a second end pivotally connected with the respective endless conveyor, such that the angle the respective supporting element forms with the horizontal in the descending part of the conveyor at the delivery end is maintained up to the delivery end of the conveyor.

22. The apparatus according to claim 1, wherein the delivery element is movable up and down with the aid of a drive.

23. The apparatus according to claim 1, further comprising at least one supporting conveyor, drivable in two directions, in support of the container, so that the container is movable in a horizontal direction relative to the delivery element.

24. A method for delivering substantially spherical products into a substantially rectangular container having an open top, said method comprising:
   ordering the products coming from a discharge conveyor of another apparatus in a particular desired pattern with the aid of a vibrating operation using a comb-shaped threshold plate serving as a threshold and inclined slightly upwards; and
   picking up and placing in the substantially rectangular container the products while in such pattern.

25. The method according to claim 24, wherein said pattern comprises a row of products.

26. The method according to claim 24, wherein, with the aid of sensors, observing whether a complete pattern has formed, and wherein the refraining from picking up products until it has been established with the sensors that the pattern to be picked up has been formed completely.

27. The method according to claim 24, wherein said picking the products in such patterns takes place with the aid of an intermediate conveyor, which intermediate conveyor transfers the pattern of products to a delivery element, which delivery element transfers the pattern of products to a positioning device, which positioning device places the pattern of products in the container.

28. The method according to claim 24, wherein the vibrating operation is carried out with the aid of a vibrating feeder.

29. An apparatus for delivering substantially spherical products into a substantially rectangular container having an open top, said apparatus comprising:
   a delivery element arranged to be movable up and down relative to the container, the container being movable in a horizontal direction relative to the delivery element, the delivery element comprising at least one endless conveyor which is provided with supporting elements which define a number of supporting surfaces extending substantially in a horizontal direction;
   an intermediate conveyor arranged upstream of the delivery element, the intermediate conveyor aligned with the delivery element and arranged for row-by-row transfer of the products to the delivery element;
   a vibrating feeder arranged upstream of the intermediate conveyor, the vibrating feeder having a discharge side aligned with an infeed side of the intermediate conveyor and having an infeed side alignable with a discharge conveyor of another apparatus; and
   a positioning device adjacent a delivery end of the delivery element and connected with the delivery element, the positioning device provided with a V-shaped receiving cavity for receiving a row of products which has been delivered by the delivery element, while the V-shaped receiving cavity is rotatable about a first axis extending in a horizontal direction.

30. An apparatus for delivering substantially spherical products into a substantially rectangular container having an open top, said apparatus comprising:
   a delivery element arranged to be movable up and down relative to the container, the container being movable in a horizontal direction relative to the delivery element, the delivery element comprising at least one endless conveyor which is provided with supporting elements which define a number of supporting surfaces extending substantially in a horizontal direction;
   an intermediate conveyor arranged upstream of the delivery element, the intermediate conveyor aligned with the delivery element and arranged for row-by-row transfer of the products to the delivery element;
   a vibrating feeder arranged upstream of the intermediate conveyor, the vibrating feeder having a discharge side aligned with an infeed side of the intermediate conveyor and having an infeed side alignable with a discharge conveyor of another apparatus; and
   a positioning device adjacent a delivery end of the delivery element and connected with the delivery element, the positioning device comprising two rows of brushes, with each row of brushes connected with an associated rotation shaft, rotatable in opposite directions, which rotation shafts are arranged so as to be movable relative to the delivery element in vertical direction.

* * * * *